US007649808B2

(12) United States Patent  (10) Patent No.: US 7,649,808 B2
Oura et al. (45) Date of Patent: Jan. 19, 2010

(54) DISTANCE MEASURING SYSTEM AND METHOD UTILIZING INFRARED RADIATION AND ULTRASONIC WAVE

(75) Inventors: Keiji Oura, Tokyo (JP); Kenji Suzuki, Tokyo (JP); Hiroyuki Kobayashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 11/806,645

(22) Filed: Jun. 1, 2007

(65) Prior Publication Data
US 2008/0031093 A1 Feb. 7, 2008

(30) Foreign Application Priority Data
Aug. 4, 2006 (JP) ............................. 2006-213254

(51) Int. Cl.
G01B 17/00 (2006.01)
(52) U.S. Cl. ..................................... 367/128
(58) Field of Classification Search ............. 367/9–116, 367/118–129, 98, 128, 900; 342/107–112, 342/118–146, 357.08; 356/3–22
See application file for complete search history.

(56) References Cited

U.S. PATENT DOCUMENTS

| 4,315,325 | A | * | 2/1982 | Blades | 367/900 |
|---|---|---|---|---|---|
| 4,939,701 | A | | 7/1990 | Brunner et al. | |
| 5,298,905 | A | * | 3/1994 | Dahl | 342/54 |
| 6,553,013 | B1 | | 4/2003 | Jones et al. | |
| 2006/0064013 | A1 | | 3/2006 | Ake et al. | |
| 2006/0239121 | A1 | * | 10/2006 | Kong et al. | 367/128 |
| 2008/0031093 | A1 | * | 2/2008 | Oura et al. | 367/128 |

FOREIGN PATENT DOCUMENTS

| JP | 60-78375 | 5/1985 |
|---|---|---|
| JP | 8-29543 | 2/1996 |
| JP | 9-160721 | 6/1997 |
| JP | 11-212691 | 8/1999 |
| JP | 2002-358157 | 12/2002 |

(Continued)

OTHER PUBLICATIONS

European Search Report dated Dec. 4, 2007.

(Continued)

*Primary Examiner*—Dan Pihulic
(74) *Attorney, Agent, or Firm*—McGinn IP Law Group, PLLC

(57) ABSTRACT

A distance measuring system comprising: a transmitter that simultaneously emits an infrared radiation and an ultrasonic wave; and a receiver that include a table showing a relationship between an arrival time, indicative of a period from detection of the received infrared radiation to detection of the received ultrasonic wave, and a required received signal strength of the ultrasonic wave corresponding to the arrival time when the ultrasonic wave is directly received, that compares the received signal strength of the ultrasonic wave with a required received signal strength corresponding to the arrival time retrieved from the table, and that calculates the distance to the transmitter based on the arrival time when the received signal strength of the ultrasonic wave is higher than the required received signal strength corresponding to the arrival time retrieved from the table.

20 Claims, 5 Drawing Sheets

FOREIGN PATENT DOCUMENTS

| | | |
|---|---|---|
| JP | 2003-216335 | 7/2003 |
| JP | 2003-222670 | 8/2003 |
| JP | 2004-151789 | 5/2004 |
| JP | 2005-10011 | 1/2005 |
| JP | 2006-64504 | 3/2006 |
| JP | 2006-125985 | 5/2006 |
| JP | 2007-179507 | 7/2007 |
| WO | WO 2005/111653 A2 | 11/2005 |

OTHER PUBLICATIONS

Japanese Office Action dated Apr. 2, 2008, with Partial English Language translation.

* cited by examiner

| ARRIVAL TIME t | Ath(t) | Bth(t) |
|---|---|---|
| 1 | 20 | 60 |
| 2 | 12 | 35 |
| 3 | 8 | 25 |
| 4 | 7 | 20 |
| 5 | 6 | 17 |
| 6 | 5 | 15 |
| 7 | 4 | 12 |
| 8 | 3 | 10 |
| 9 | 3 | 9 |
| 10 | 2 | 8 |
| 11 | 2 | 7 |
| 12 | 1 | 6 |
| 13 | 1 | 5 |

DISTANCE MEASURING SYSTEM AND METHOD UTILIZING INFRARED RADIATION AND ULTRASONIC WAVE

This application is based upon and claims the benefit of priority from Japanese Patent Application No. 2006-213254 filed on Aug. 4, 2006, the disclosure of which is incorporated herein in its entirety by reference.

BACKGROUND OF THE INVENTION

1. Field of the Invention

The present invention relates to a distance measuring system and method for measuring the distance between two points utilizing an ultrasonic wave.

2. Description of the Related Art

As a system for measuring the distance between two points, Japanese Patent Laid-Open No. 2006-64504 (hereinafter called "Patent Document 1") describes an ultrasonic distance measuring apparatus for measuring the distance between a transmitter and a receiver based on a difference between arrival times at the receiver of an infrared radiation and an ultrasonic wave which have been simultaneously emitted from the transmitter.

The ultrasonic distance measuring apparatus described in Patent Document 1 calculates the distance based on the time required for the ultrasonic wave, which travels at the velocity of sound, to be transmitted from the transmitter to the receiver on the assumption that infrared radiation is emitted and received at substantially the same time. The receiver rectifies an ultrasonic wave reception signal using a half-wave rectifier circuit, the output voltage of which is smoothed by a capacitor. Then, the receiver determines that the ultrasonic wave is received when the output voltage of the capacitor exceeds a previously set threshold. The receiver determines a period from the time the infrared radiation reception signal was detected to the time the output voltage of the capacitor exceeds the threshold voltage, as the time required for the ultrasonic wave to be transmitted from the transmitter to the receiver.

However, the conventional distance measuring system as described above can erroneously determine the distance between the transmitter and receiver if an obstacle exists outside of a measurable area (area in which the system can measure the distance between the transmitter and receiver), and if, other than an ultrasonic wave which arrives directly at the receiver from the transmitter (hereinafter called the "direct wave"), as illustrated in FIG. 1, another ultrasonic wave from the transmitter arrives at the receiver after it has been reflected by the obstacle (hereinafter called the "reflected wave").

For example, when the distance between the transmitter and receiver is measured at each predetermined time to detect movements of the transmitter (or receiver), the transmitter repeatedly emits the infrared radiation and ultrasonic wave at constant period T. In this event, if a reflected wave of an ultrasonic wave emitted from the transmitter at certain period T is detected between an infrared radiation reception signal at the next period and a received direct wave signal, and if the received reflected wave signal exceeds the threshold voltage, as illustrated in FIG. 2, the receiver calculates the distance from arrival time tb of the reflected wave, rather than from arrival time ta of the direct wave. This causes a problem of reduced measurement accuracy of the distance between the transmitter and receiver.

SUMMARY OF THE INVENTION

It is therefore an object of the present invention to provide a distance measuring system and method which are capable of preventing a reduction in measurement accuracy of the distance between a transmitter and a receiver.

To achieve the above object, in the present invention, a receiver is previously provided with a table showing a relationship between the arrival time, indicative of a period from the detection of a received infrared radiation to the detection of a received ultrasonic wave, and the required received signal strength of the ultrasonic wave corresponding to the arrival time when the ultrasonic wave is directly received. A transmitter simultaneously emits infrared radiation and an ultrasonic wave. Upon receipt of the infrared radiation and ultrasonic wave, the receiver compares the received signal strength of the ultrasonic wave with required received signal strength corresponding to the arrival time, retrieved from the table, and calculates the distance to the transmitter based on the arrival time when the received signal strength of the ultrasonic wave is higher than the required received signal strength that corresponds to the arrival time retrieved from the table.

In another aspect, similar to the above, a receiver is previously provided with a table showing a relationship between the arrival time, indicative of a period from the detection of a received infrared radiation to the detection of a received ultrasonic wave, and the required received signal strength of the ultrasonic wave corresponding to the arrival time when the ultrasonic wave is directly received. A transmitter simultaneously emits an infrared radiation and an ultrasonic wave. Upon receipt of the infrared radiation and ultrasonic wave, the receiver measures the arrival time of the ultrasonic wave based on a period from the detection of the received infrared radiation to the detection of a ultrasonic wave reception signal exceeding a threshold for use in determining whether or not the ultrasonic wave is received, updates the threshold with the value of a required received signal strength corresponding to the arrival time, retrieved from the table, and calculates the distance to the transmitter based on the calculated arrival time.

In the distance measuring system as described above, the receiver compares the strength of a received ultrasonic wave with a required received signal strength corresponding to the arrival time, retrieved from the table, and determines that the received ultrasonic wave is a reflected wave by an obstacle when the received signal strength of the received ultrasonic wave is lower than the required value despite a short arrival time.

Also, since the threshold that is used in determining whether or not an ultrasonic wave is received is updated with the value of a required received signal strength corresponding to an arrival time, retrieved by referencing the table, the updated threshold is not exceeded by a reflected wave which has a received signal strength that is lower than a required value for the arrival time. Thus, a reception signal will not be generated from such a reflected wave.

Consequently, the distance measuring system prevents the distance from being erroneously calculated due to a reflected wave, and therefore prevents a reduction in measurement accuracy of the distance between the transmitter and receiver.

The above and other objects, features, and advantages of the present invention will become apparent from the following description with reference to the accompanying drawing which illustrate an example of the present invention.

DETAILED DESCRIPTION OF THE PREFERRED EMBODIMENTS

First Exemplary Embodiment

A distance measuring system of the present invention is similar to the conventional distance measuring system in that infrared radiation and an ultrasonic wave are simultaneously emitted from a transmitter for a fixed period, and the distance between the transmitter and receiver is measured based on the difference between the time the infrared radiation arrives at the receiver and the time the ultrasonic wave arrives at the receiver.

Generally, ultrasonic waves for use in measurement of distance are at a frequency of several tens kHz, and the strength of the ultrasonic wave received at a receiver attenuates depending on the traveling distance of the ultrasonic wave, i.e., from the time the receiver received an infrared radiation to the time the receiver receives the ultrasonic wave. Therefore, when a received ultrasonic wave presents a strength lower than a required value despite a short arrival time, the received ultrasonic wave can be determined to be a reflected wave from an obstacle.

In a first exemplary embodiment, a receiver is previously provided with a table which shows the arrival time of the ultrasonic wave and a required received signal strength (expected minimum received signal strength) corresponding thereto when the ultrasonic wave is directly received, and compares the strength of a received ultrasonic wave with the required received signal strength that corresponds to the arrival time retrieved from the table. Then, when the strength of the received ultrasonic wave is higher than the required received signal strength that corresponds to the arrival time retrieved from the table, the receiver determines that the ultrasonic wave is a direct wave, and calculates the distance from the arrival time.

Figure 1:
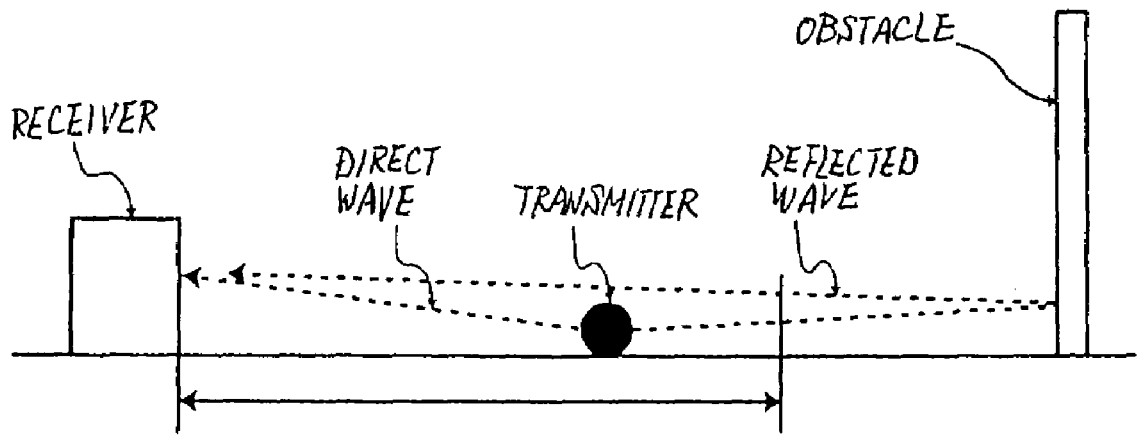
FIG. 1 is a schematic diagram illustrating an example in which a conventional distance measuring system erroneously measures the distance between a transmitter and a receiver.
Figure 2:
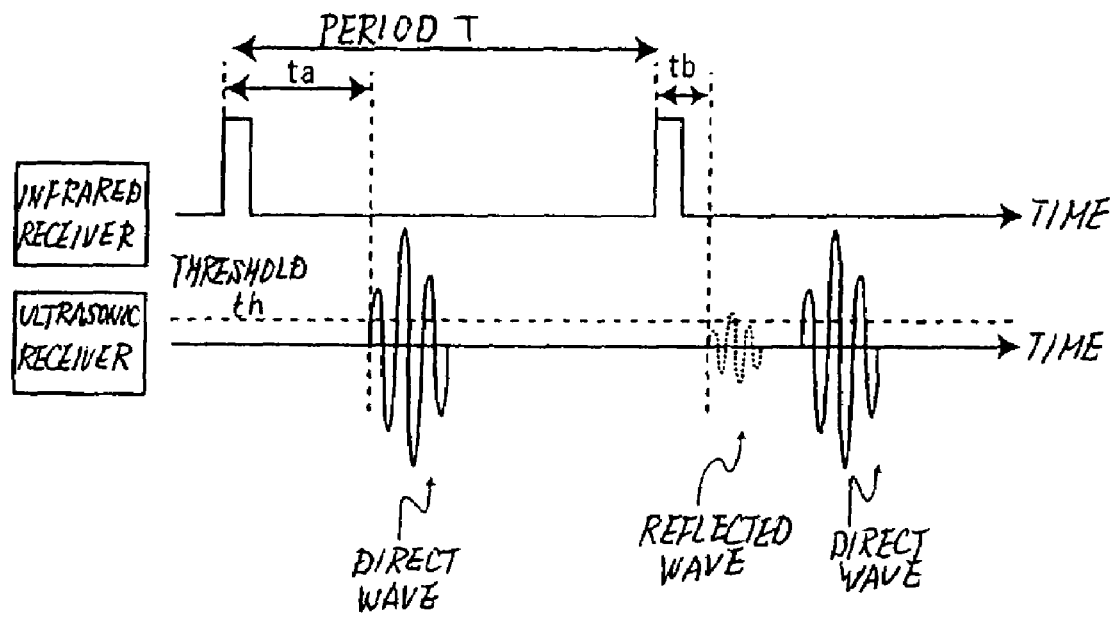
FIG. 2 is a waveform chart illustrating how the distance is erroneously calculated by the receiver shown in FIG. 1.
Figure 3:
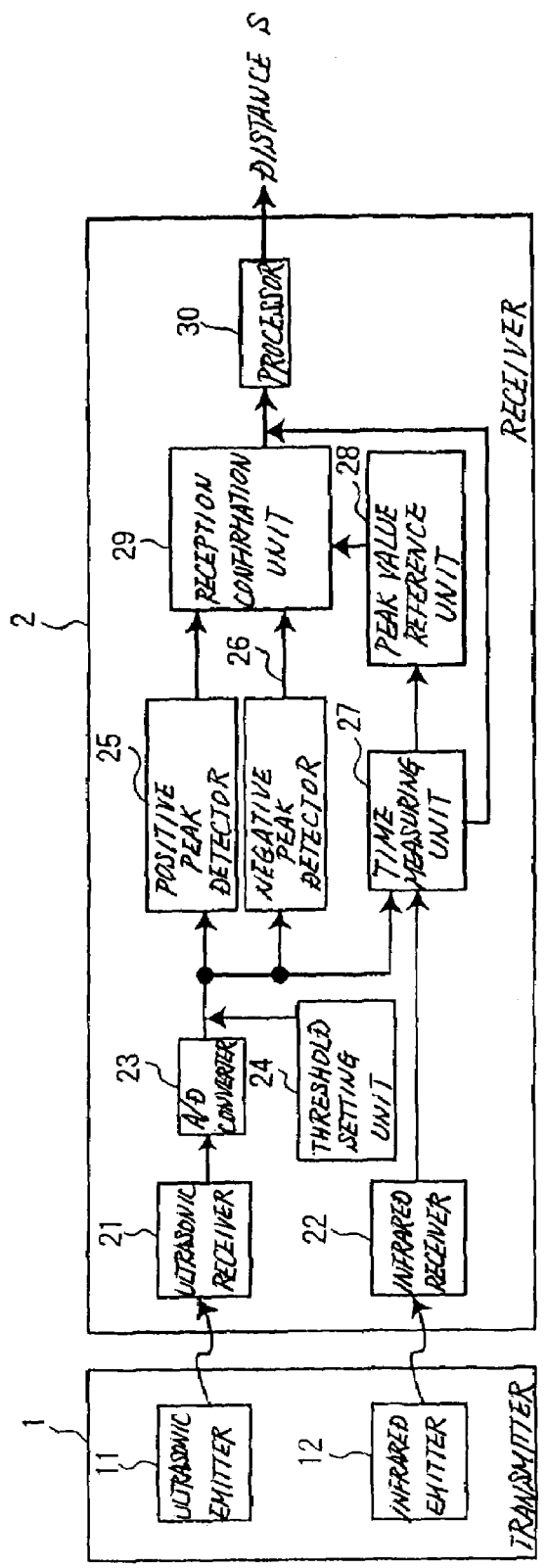
FIG. 3 is a block diagram illustrating the configuration of a first exemplary embodiment of a distance measuring system according to the present invention.
Figures 4, 5:
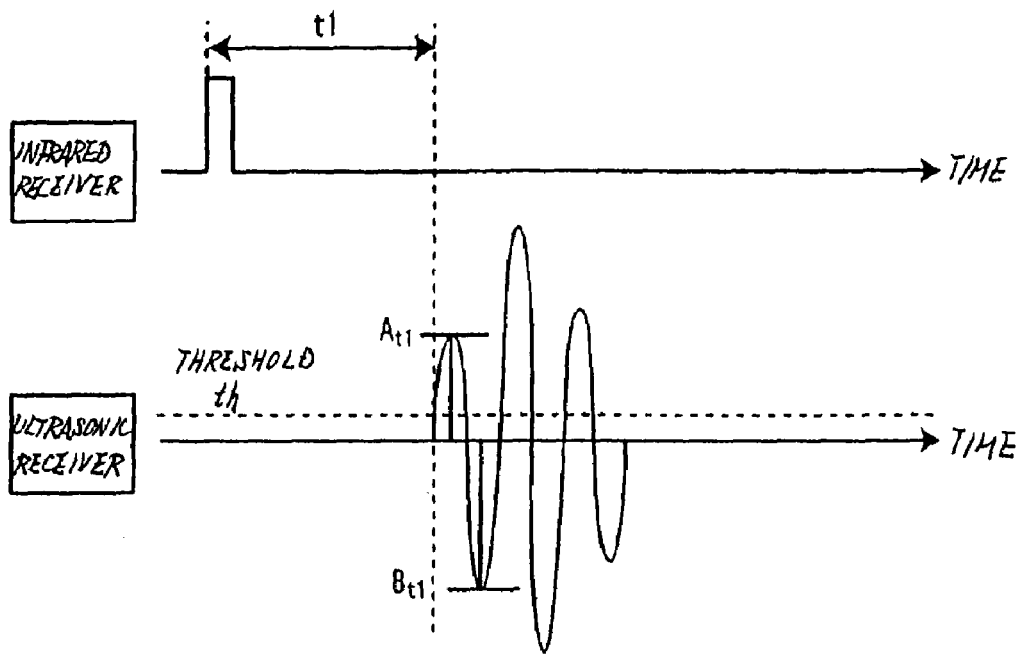
FIG. 4 is a waveform chart illustrating exemplary operations of a time measuring unit, a positive peak detector, and a negative peak detector shown in FIG. 3.
FIG. 5 is a schematic diagram showing an exemplary positive peak reference table and negative peak reference table stored in a peak value reference unit shown in FIG. 3.

FIG. 3 is a block diagram illustrating the configuration of the first exemplary embodiment of the distance measuring system according to the present invention, and FIG. 4 is a waveform chart illustrating exemplary operations of a time measuring unit, a positive peak detector, and a negative peak detector shown in FIG. 3.

As illustrated in FIG. 3, in the distance measuring system of the first exemplary embodiment, transmitter 1 comprises ultrasonic emitter 11 and infrared emitter 12, while receiver 2 comprises ultrasonic receiver 21, infrared receiver 22, A/D converter 23, threshold setting unit 24, positive peak detector 25, negative peak detector 26, time measuring unit 27, peak value reference unit 28, reception confirmation unit 29, and processor 30.

Ultrasonic emitter 11 comprises an ultrasonic emitting element, and infrared emitter 12 comprises an infrared emitting element. As described above, transmitter 1 of this exemplary embodiment simultaneously emits the ultrasonic wave and infrared radiation for a fixed period from ultrasonic emitter 11 and infrared emitter 12, respectively.

Ultrasonic receiver 21, which comprises an ultrasonic receiving element, receives the ultrasonic wave emitted from ultrasonic emitter 11, and generates a sinusoidal reception signal proportional to the received ultrasonic strength, as shown in FIG. 4. Infrared receiver 22, which comprises an infrared receiving element, receives the infrared radiation emitted from infrared emitter 12, and generates a pulsed reception signal as shown in FIG. 4.

A/D converter 23 converts the ultrasonic reception signal (analog signal), supplied from ultrasonic receiver 21, into a digital signal.

Threshold setting unit 24 generates threshold th for use in determination as to whether or not an ultrasonic wave is received, and supplies its output signal to positive peak detector 25, negative peak detector 26, and time measuring unit 27, respectively, when the ultrasonic reception signal (digital signal) generated from A/D converter 23 exceeds threshold th.

Time measuring unit 27 measures time (arrival time) t1 from the time the infrared reception signal is detected to the time the ultrasonic reception signal exceeding threshold th is detected, as shown in FIG. 4.

Positive peak detector 25 detects positive peak value $A_{t1}$ (first peak value) in the first period immediately after arrival time t1, in the ultrasonic wave reception signal, as shown in FIG. 4. Negative peak detector 26 in turn detects negative peak value $B_{t1}$ (second peak value) in the first period immediately after arrival time t1 in the ultrasonic reception signal. Positive peak detector 25 and negative peak detector 26 may be implemented, for example, using known sample/hold circuits.

Peak value reference unit 28 is a storage device which stores a positive peak reference table showing the relationship between the arrival time of the ultrasonic wave and a required received signal strength corresponding thereto when the ultrasonic wave is directly received in a positive domain, and a negative peak reference table showing the relationship between the arrival time of the ultrasonic wave and a required received signal strength corresponding thereto when the ultrasonic wave is directly received in a negative domain.

Figure 6:
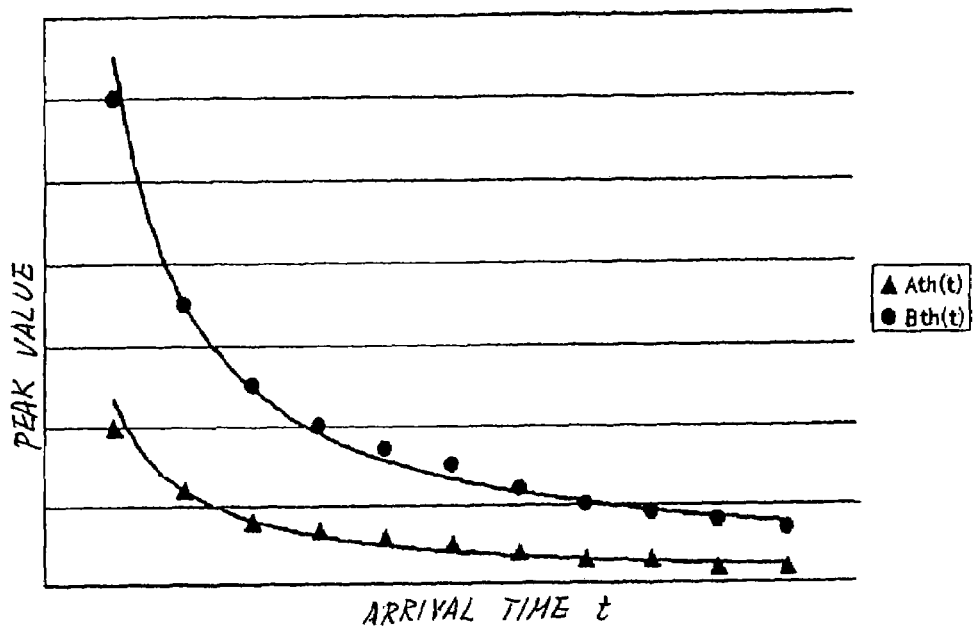
FIG. 6 is a graph representing the relationship between ultrasonic wave arrival time and required received signal strength (peak value) created from the positive peak reference table and the negative peak reference table shown in FIG. 5.

FIG. 5 is a schematic diagram showing an exemplary positive peak reference table and negative peak reference table stored in peak value reference unit 28. FIG. 6 is a graph representing the relationship between the arrival time of the ultrasonic wave and a required received signal strength (peak value), created from the positive peak reference table and negative peak reference table shown in FIG. 5. It should be noted that since FIG. 5 schematically shows the relationship between the arrival time of the direct wave and the required received signal strength corresponding thereto, units of arrival time t, Ath(t), and Bth(t) are omitted in the description.

In consideration of the output strength of the ultrasonic emitting element included in ultrasonic emitter 11, the reception sensitivity of the ultrasonic receiving element included in ultrasonic receiver 21, and the like, minimum received signal strengths (the positive peak value and negative peak value in the first period) are calculated respectively for expected direct waves with respect to possible arrival times t. The positive peak reference table and negative peak reference table associatively store arrival time t and positive required received signal strength Ath(t) and negative required received signal strength Bth(t) that correspond to arrival time t.

Reception confirmation unit 29 references the positive peak reference table and negative peak reference table stored in peak value reference unit 28 to determine the presence of a direct wave when peak value $A_{t1}$ detected by positive peak detector 25 is larger than table value Ath(t1) [first required received signal strength] corresponding to arrival time t1 measured by time measuring unit 27, and to determine the presence of a direct wave when peak value $B_{t1}$ detected by negative peak detector 26 is larger than table value Bth(t1) [second required received signal strength] corresponding to arrival time t1 measured by time measuring unit 27. On the other hand, reception confirmation unit 29 determines the presence of a reflected wave when peak value $A_{t1}$ is smaller than table value Ath(t1) [first required received signal strength] or when peak value $B_{t1}$ is smaller than table value Bth(t1) [second required received signal strength].

Processor 30 calculates the distance between transmitter 1 and receiver 2 using the value of corresponding arrival time t1 measured by time measuring unit 27 when reception confirmation unit 29 determines the presence of a direct wave. For example, distance s can be calculated by s=c×t1, where c represents the velocity of sound (approximately 340 m/s). Calculated distance s is used, for example, as a processing parameter by a processing apparatus, not shown. Additionally, calculated distance s may be displayed on a display device, not shown. In this way, processor 30 is prevented from erroneously calculating the distance between transmitter 1 and receiver 2 using a reflected wave.

While FIG. 3 shows receiver 2 which comprises threshold setting unit 24, time measuring unit 27, reception confirmation unit 29, and processor 30 independently of one another, the functions of these components may be implemented by an LSI which comprises a combination of various logic circuits, or by a CPU or a DSP which executes processing in accordance with a program.

Transmitter 1 comprises a controller, not shown, which has a CPU or a DSP for executing processing in accordance with a program, or an LSI which includes a combination of various logic circuits, and simultaneously emits the ultrasonic wave and infrared radiation from ultrasonic emitter 11 and infrared emitter 12 under the control of the controller.

Figure 7:
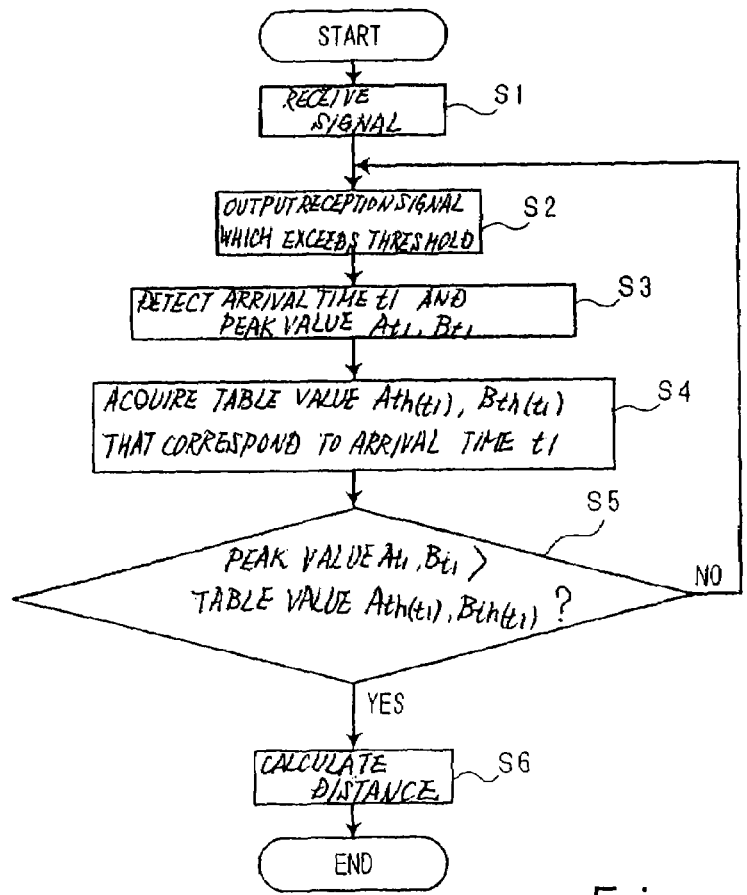
FIG. 7 is a flow chart illustrating the processing procedure of a receiver included in the distance measuring system of the first exemplary embodiment.

FIG. 7 is a flow chart illustrating a processing procedure of the receiver included in the distance measuring system of the first exemplary embodiment.

As illustrated in FIG. 7, in receiver 2 of the first exemplary embodiment, infrared receiver 22 first receives an infrared radiation emitted from infrared emitter 12, and generates a pulsed reception signal as shown in FIG. 4. Ultrasonic receiver 21 in turn receives an ultrasonic wave emitted from ultrasonic emitter 11, and generates a sinusoidal reception signal proportional to the received signal strength, as shown in FIG. 4 [step S1].

Next, in receiver 2, A/D converter 23 converts the reception signal supplied from ultrasonic receiver 21 into digital form, and threshold setting unit 24 delivers the A/D converted reception signal which exceeds threshold th [step S2].

Subsequently, in receiver 2, time measuring unit 27 measures time (arrival time) t1 from the time the infrared radiation reception signal was detected to the time that the ultrasonic wave reception signal exceeding threshold th is detected. Also, positive peak detector 25 detects peak positive value $A_{t1}$ in the first period immediately after arrival time t1, while negative peak detector 26 detects negative peak value $B_{t1}$ in the first period immediately after arrival time t1 [step S3].

Next, in receiver 2, reception confirmation unit 29 references the positive peak reference table and negative peak reference table stored in peak value reference unit 29B to retrieve table values Ath(t1), Bth(t1), respectively, corresponding to arrival time t1 measured by time measuring unit 27 [step S4]. Then, reception confirmation unit 29 determines whether or not peak values $A_{t1}$, $B_{t1}$ of the reception signal are larger than table values Ath(t), Bth(t1) [step S5], and determines that the corresponding reception signal represents a reflected wave when peak values $A_{t1}$, $B_{t1}$ are equal to or smaller than table values Ath(t1), Bth(t1). The flow returns to step S2 to repeat processing at steps S2-S5.

On the other hand, when peak values $A_{t1}$, $B_{t1}$ are larger than table values Ath(t1), Bth(t1), reception confirmation unit 29 determines that the corresponding reception signal represents a direct wave, and passes the value of arrival time t1 to processor 30. Processor 30 calculates distance s from arrival time t1 [step S6], and supplies the calculated distance s to an external display device, processing device and the like.

According to the distance measuring system of the foregoing exemplary embodiment, receiver 2 is previously provided with a table showing the relationship between an arrival time of the ultrasonic wave and a required received signal strength of a direct wave corresponding thereto when it is received, and calculates the distance from the arrival time only when the received signal strength of the ultrasonic wave is larger than the required received signal strength that corresponds to the arrival time retrieved from the table, thus preventing processor 30 from calculating the distance using a reflected wave which presents a received signal strength lower than the required value for the arrival time. Consequently, the distance measuring system prevents a reduction in measurement accuracy of the distance between transmitter 1 and receiver 2.

Second Exemplary Embodiment

In a second exemplary embodiment, a receiver is previously provided with a table showing the relationship between the arrival time of the ultrasonic wave and a required received signal strength (expected minimum received signal strength) corresponding to the arrival time when the ultrasonic wave is directly received, in a manner similar to the first exemplary embodiment. Then, a threshold for use in determining whether or not an ultrasonic wave is received is updated with the value of the required received signal strength that corresponds to the arrival time retrieved from the table. By thus updating the threshold in accordance with the arrival time, since a reflected wave reception signal presents a received signal strength lower than the required value for the arrival time and therefore does not exceed the threshold, the reflected wave will never be used in the measurement of the distance.

Figure 8:
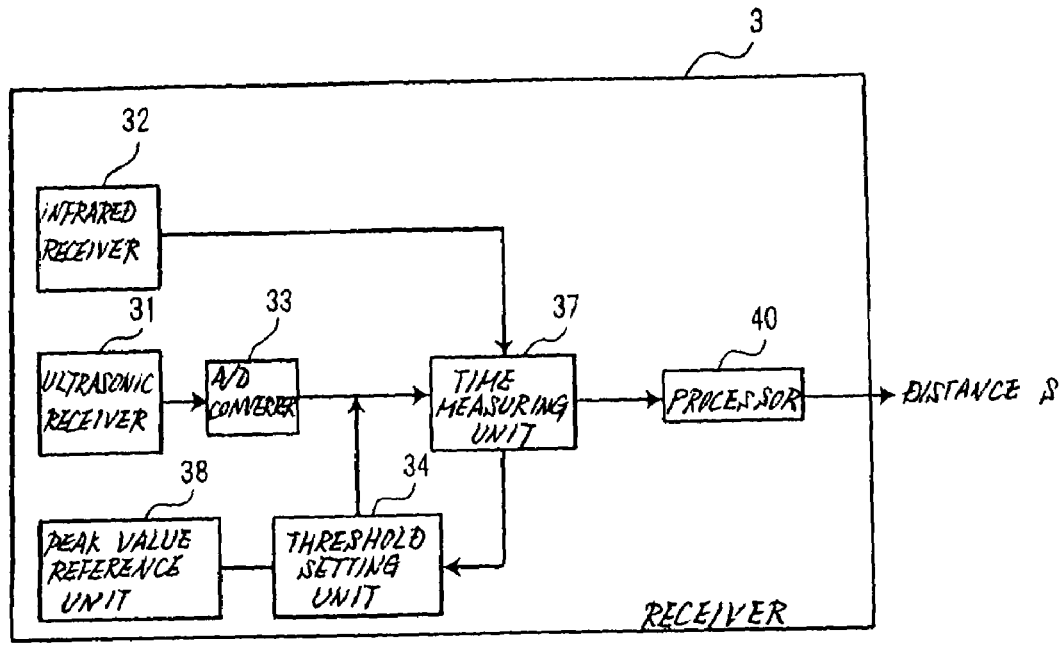
FIG. 8 is a block diagram illustrating the configuration of a second exemplary embodiment of the distance measuring system according tot the present invention.

FIG. 8 is a block diagram illustrating the configuration of the second exemplary embodiment of the distance measuring system according to the present invention.

As illustrated, the distance measuring system of the second exemplary embodiment comprises ultrasonic receiver 31, infrared receiver 32, A/D converter 33, threshold setting unit 34, time measuring unit 37, peak value reference unit 38, and processor 40 in receiver 3.

In the distance measuring system of the second exemplary embodiment, threshold setting unit 34 of receiver 3 updates threshold th for determining whether or not an ultrasonic wave is received, based on the value of arrival time t1 measured by time measuring unit 37. Like the first exemplary embodiment, peak value reference unit 38 stores a positive peak reference table showing the relationship between the arrival time of ultrasonic wave and the required received signal strength that corresponds to the arrival time when the ultrasonic wave is directly received in the positive domain (see FIG. 5).

Threshold setting unit 34 initially sets threshold th to the value of the required received signal strength of the expected direct wave, corresponding to the furthest location within a measurable area (longest arrival time). Then, as time measuring unit 37 delivers arrival time t1, threshold setting unit 34 references the positive peak reference table stored in peak value reference unit 38 to retrieve table value Ath(t1) corresponding to arrival time t1, and updates threshold th with the retrieved table value Ath(t1). In this event, an ultrasonic wave reception signal that exceeds updated threshold th(Ath(t1)) alone is delivered from threshold setting unit 34 in the next period.

As in the first exemplary embodiment, time measuring unit 37 measures time (arrival time) t1 from the time an infrared radiation reception signal is detected to the time an ultrasonic wave reception signal that exceeds threshold th is detected. When time measuring unit 37 supplies arrival time t1, processor 40 calculates distance s between a transmitter and receiver 3 from this arrival time t1, and supplies calculated distance s to an external display device, processing device and the like.

Other components, i.e., ultrasonic receiver 31, infrared receiver 32, and A/D converter 33 are similar in configuration to ultrasonic receiver 21, infrared receiver 22, and A/D converter 23, respectively, shown in the first exemplary embodiment, so that a description thereon is omitted. Also, since the transmitter is similar in configuration to that in the first exemplary embodiment, a description thereon is omitted.

Figure 9:
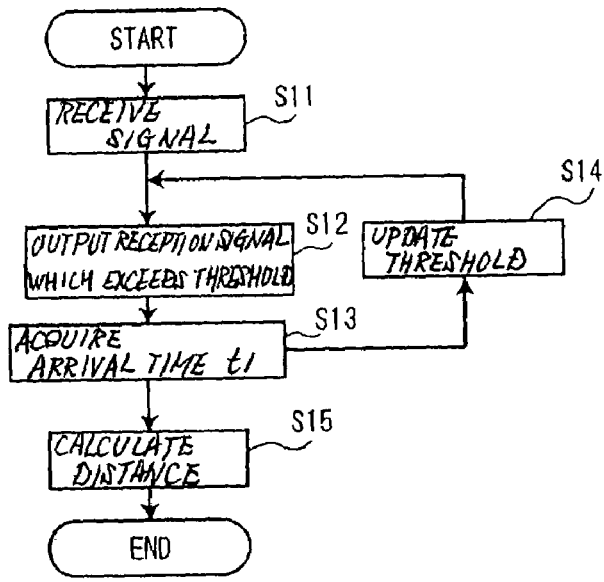
FIG. 9 is a flow chart illustrating the processing procedure of a receiver included in the distance measuring system of the second exemplary embodiment.

FIG. 9 is a flow chart illustrating a processing procedure of the receiver included in the distance measuring system of the second exemplary embodiment.

As illustrated in FIG. 9, in receiver 3 of the second exemplary embodiment, infrared receiver 32 first receives an infrared radiation emitted from an infrared emitter, and generates a pulsed reception signal. Ultrasonic receiver 31 in turn receives an ultrasonic wave emitted from an ultrasonic emitter, and generates a sinusoidal reception signal proportional to the received signal strength of the ultrasonic wave [step S11].

Next, in receiver 3, A/D converter 33 A/D converts the ultrasonic wave reception signal supplied from ultrasonic receiver 32, and threshold setting unit 34 supplies time measuring unit 37 with the A/D converted reception signal which exceeds threshold th [step S12]. Time measuring unit 37 measures time (arrival time) t1 from the time the infrared radiation reception signal was detected to the time the ultrasonic wave reception signal that exceeds threshold th is detected [step S13].

Next, in receiver 3, threshold setting unit 34 references the positive peak reference table stored in peak value reference unit 38 to retrieve table value Ath(t1) that corresponds to arrival time t1 measured by time measuring unit 37, and updates the value of threshold th with table value Ath(t1) [step S14]. Then, the flow returns to step S12 to repeat processing at steps S12-S14.

As threshold setting unit 34 supplies the ultrasonic wave reception signal exceeding threshold th, time measuring unit 37 measures arrival time t1, and processor 40 calculates distance s between the transmitter and receiver 3 based on arrival time t1 only when time measuring unit 37 supplies arrival time t1 [step S15].

While the foregoing description has been given of an example in which threshold setting unit 34 updates threshold th with reference to the positive peak reference table stored in peak value reference unit 38, threshold setting unit 34 may update threshold th with reference to the negative peak reference table, or may update threshold th with reference to both the positive peak reference table and the negative peak reference table. To update threshold th with reference to the negative peak reference table, threshold setting unit 34 may set table value Bth(t1) that corresponds to arrival time t1 as threshold th for the ultrasonic wave reception signal in the negative domain. On the other hand, to update threshold th with reference to both the positive peak reference table and the negative peak reference table, threshold setting unit 34 may set table value Ath(t1) that corresponds to arrival time t1 as threshold value th for the ultrasonic wave reception signal in the positive domain, and set table value Bth(t1) that corresponds to arrival time t1 as threshold th for the ultrasonic wave reception signal in the negative domain.

According to the distance measuring system of the second exemplary embodiment, since the threshold for use in determining whether or not an ultrasonic wave is received is updated with a required received signal strength that corresponds to a measured arrival time, threshold setting unit 24 is prevented from supplying time measuring unit 37 with a reflected wave reception signal which has a received signal strength lower than a required value for the arrival time. Accordingly, as in the first exemplary embodiment, the distance measuring system prevents the distance from being erroneously calculated using a reflected wave, and prevents a reduction in measurement accuracy of the distance between the transmitter and receiver 3.

While preferred exemplary embodiments of the present invention have been described using specific terms, such description is for illustrative purposes only, and it is to be understood that changes and variations may be made without departing from the spirit or scope of the following claims.

What is claimed is:

1. A distance measuring system, comprising:
   a transmitter that simultaneously emits an infrared radiation and an ultrasonic wave; and
   a receiver that includes a table showing a relationship between an arrival time, indicative of a period from a detection of receiving the infrared radiation to a detection of receiving the ultrasonic wave, and a required received signal strength of the ultrasonic wave corresponding to the arrival time when the ultrasonic wave is directly received, that compares a received signal strength of the ultrasonic wave with a required received signal strength corresponding to the arrival time retrieved from the table, and that calculates a distance to said transmitter based on the arrival time when the received signal strength of the ultrasonic wave is higher than the required received signal strength corresponding to the arrival time retrieved from the table, said table indicating positive peak reference information showing a relationship between the arrival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain.

2. The distance measuring system according to claim 1, wherein said receiver comprises:
an infrared receiver for receiving the infrared radiation emitted from said transmitter;
an ultrasonic receiver for receiving the ultrasonic wave emitted from said transmitter,
a positive peak detector for detecting a first peak value indicative of a positive peak value of an ultrasonic wave reception signal generated by said ultrasonic receiver;
a negative peak detector for detecting a second peak value indicative of a negative peak value of the ultrasonic wave reception signal generated by said ultrasonic receiver;
a peak value reference unit for storing the positive peak reference information showing a relationship of a first required received signal strength corresponding to the arrival time, said first required received signal strength indicative of a positive required received signal strength when the ultrasonic wave is directly received, and for storing the negative peak reference information showing a relationship of a second required received signal strength corresponding to the arrival time, said second required received signal strength indicative of a negative required received signal strength when the ultrasonic wave is directly received;
a time measuring unit for measuring the arrival time;
a reception confirmation unit for referencing the positive peak reference information and the negative peak reference information table to retrieve a first required received signal strength and a second required received signal strength corresponding to the arrival time measured by said time measuring unit, and for determining that the received ultrasonic wave is a direct wave when the first peak value is larger than the first required received signal strength and when the second peak value is larger than the second required received signal strength; and
a processor for calculating the distance to said transmitter based on the corresponding arrival time when said reception confirmation unit determines that the received ultrasonic wave is a direct wave.

3. A distance measuring system, comprising:
a transmitter that simultaneously emits an infrared radiation and an ultrasonic wave; and
a receiver that includes a table showing a relationship between an arrival time, indicative of a period from a detection of receiving the infrared radiation to a detection of receiving the ultrasonic wave, and a required received signal strength of the ultrasonic wave corresponding to the arrival time when the ultrasonic wave is directly received, that updates a threshold for use in determining whether or not the ultrasonic wave is received with a value of a required received signal strength corresponding to the arrival time retrieved from the table, that measures the arrival time based on a period from the detection of the received infrared radiation to the detection of an ultrasonic wave reception signal exceeding the threshold, and that calculates a distance to said transmitter from the arrival time, said table indicating positive peak reference information showing a relationship between the rival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain.

4. The distance measuring system according to claim 3, wherein said receiver comprises:
an infrared receiver for receiving the infrared radiation emitted from said transmitter;
an ultrasonic receiver for receiving the ultrasonic wave emitted from said transmitter;
a peak value reference unit for storing at least one table showing a relationship of a positive required received signal strength that corresponds to the arrival time when the ultrasonic wave is directly received or one table showing a relationship of a negative required received signal strength chat corresponds to the arrival time when the ultrasonic wave is directly received;
a time measuring unit for measuring a period, from the detection of the received infrared radiation to the detection of an ultrasonic wave reception signal that exceeds the threshold, as the arrival time;
a threshold setting unit for initially setting the threshold to a required received signal strength corresponding to a furthest location within a measurable area, and responsive to the arrival time supplied from said rime measuring unit for referencing the table stored in said peak value reference unit to retrieve a required received signal strength corresponding to the arrival time, updating the threshold with a value of the retrieved required received signal strength, and for delivering an ultrasonic wave reception signal exceeding the threshold; and
a processor for calculating the distance to said transmitter using the arrival time measured by said time measuring unit.

5. A distance measuring method, comprising:
previously providing a receiver with a table showing a relationship between an arrival time indicative of a period from a detection of an infrared radiation to a detection of an ultrasonic wave, and a required received signal strength corresponding to the arrival time when the ultrasonic wave is directly received, said table indicating positive peak reference information showing a relationship between the arrival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain;
simultaneously emitting said infrared radiation and said ultrasonic wave from a transmitter;
upon receipt of the infrared radiation and the ultrasonic wave at said receiver, measuring the arrival time, and comparing a received signal strength of the ultrasonic wave with a required received signal strength corresponding to the arrival time, retrieved from the table; and
calculating a distance to said transmitter based art the arrival time, when the received signal strength of the ultrasonic wave is higher than the required received signal strength corresponding to the arrival time, retrieved from the table.

6. A distance measuring method, comprising:
previously providing a receiver with a table showing a relationship between an arrival time indicative of a time from a detection of an infrared radiation to a detection of an ultrasonic wave and a required received signal strength corresponding to the arrival time when the ultrasonic wave is directly received, said table indicating positive peak reference information showing a relationship between the arrival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain;
simultaneously emitting said infrared radiation and said ultrasonic wave from a transmitter;
upon receipt of the infrared radiation and the ultrasonic wave at said receiver, measuring the arrival time based on a period from the detection of the received infrared radiation to the detection of an ultrasonic wave reception signal exceeding a threshold for a use in determining whether or not the ultrasonic wave is received;
updating the threshold with a value of a required received signal strength corresponding to the arrival time retrieved from the cable; and
calculating a distance to said transmitter based on the arrival time.

7. A distance measuring system, comprising:
transmission means for simultaneously emitting an infrared radiation and an ultrasonic wave; and
reception means including a table showing a relationship between an arrival time, indicative of a period from a detection of receiving the infrared radiation to a detection of receiving the ultrasonic wave, and a required received signal strength of the ultrasonic wave corresponding to the arrival time when the ultrasonic wave is directly received, for comparing the received signal strength of the ultrasonic wave with a required received signal strength corresponding to the arrival time retrieved from the table, and for calculating a distance to said transmission means based on the arrival time, when the received signal strength of the ultrasonic wave is higher than the required received signal strength corresponding to the arrival time retrieved from the table, said table indicating positive peak reference information showing relationship between the arrival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain.

8. A distance measuring system, comprising:
transmission means for simultaneously emitting an infrared radiation and an ultrasonic wave; and
reception means including a table showing a relationship between an arrival time, indicative of a period from a detection of receiving the infrared radiation to detection of receiving the ultrasonic wave, and a required received signal strength of the ultrasonic wave corresponding to the arrival time when the ultrasonic wave is directly received, for updating a threshold for use in determining whether or not the ultrasonic wave is received with a value of a required received signal strength corresponding to the arrival time retrieved from the table, for measuring the arrival time based on a period from detection of the received infrared radiation to detection of an ultrasonic wave reception signal exceeding the threshold, and for calculating a distance to said transmission means from the found arrival time, said table indicating positive peak reference information showing a relationship, between the arrival time of the ultrasonic wave and a required received signal strength corresponding thereto when the ultrasonic wave is directly received in a positive domain, and negative peak reference information showing a relationship between the arrival time of the ultrasonic wave and a required received signal strength corresponding thereto when the ultrasonic wave is directly received in a negative domain.

9. The distance measuring system according to claim 1, wherein said receiver comprises:
a positive peak detector for detecting a first peak value indicative of a positive peak value of an ultrasonic wave reception signal generated by said receiver;
a negative peak detector for detecting a second peak value indicative of a negative peak value of the ultrasonic wave reception signal generated by said receiver; and
a peak value reference unit for storing the positive peak reference information showing a relationship of a first required received signal strength corresponding to the arrival time, said first required received signal strength indicative of a positive required received signal strength when the ultrasonic wave is directly received, and for storing the negative peak reference information showing a relationship of a second required received signal strength corresponding to the arrival time, said second required received signal strength indicative of a negative required received signal strength when the ultrasonic wave is directly received.

10. The distance measuring system according to claim 1, wherein, when the received signal strength of the ultrasonic wave is higher than the required received signal strength, the receiver determines that the ultrasonic wave comprises a direct wave.

11. The distance measuring system according to claim 1, wherein, when the received signal strength of the ultrasonic wave is lower than the required received signal strength, the receiver determines that the received ultrasonic wave comprises a reflected wave from an obstacle.

12. The distance measuring system according to claim 2, wherein said receiver further comprises:
a threshold setting unit for initially setting a threshold to a required received signal strength corresponding to a furthest location within a measurable area, and responsive to the arrival time supplied from said time measuring unit for referencing the table to retrieve a required received signal strength corresponding to the arrival time, updating the threshold with a value of the retrieved required received signal strength, and for delivering an ultrasonic wave reception signal exceeding the threshold.

13. The distance measuring system according to claim 12, wherein said threshold setting unit generates the threshold for a use in determination whether an ultrasonic wave is received, and supplies an output signal to the positive peak detector, the negative peak detector, and the time measuring unit, when an ultrasonic reception signal generated from an A/D converter exceeds the threshold.

14. The distance measuring system according to claim 13, wherein the time measuring unit measures the arrival time from a time the infrared reception signal is detected to a time the ultrasonic reception signal exceeding the threshold is detected.

15. The distance measuring system according to claim 3, wherein said receiver comprises:
   a peak value reference unit for storing at least one table showing a relationship of a positive required received signal strength that corresponds to the arrival time when the ultrasonic wave is directly received or one table showing a relationship of a negative required received signal strength that corresponds to the arrival time when the ultrasonic wave is directly received.

16. The distance measuring system according to claim 3, wherein, when a strength of the received ultrasonic wave is lower than the required signal strength, the receiver determines that the received ultrasonic wave comprises a reflected wave from an obstacle, and
   wherein, when a strength of the received ultrasonic wave is higher than the required received signal strength, the receiver determines that the ultrasonic wave comprises a direct wave.

17. The distance measuring system according to claim 4, wherein said threshold setting unit generates the threshold for use in determining whether an ultrasonic wave is received, and supplies its output signal to a positive peak detector, a negative peak detector, and the time measuring unit, when an ultrasonic reception signal generated from an A/D converter exceeds the threshold.

18. The distance measuring system according to claim 17, wherein the time measuring unit measures the arrival time from a time the infrared reception signal is detected to a time the ultrasonic reception signal exceeding the threshold is detected.

19. The distance measuring system according to claim 5, wherein, when the received signal strength of the ultrasonic wave is lower than the required received signal strength, the receiver determines that the received ultrasonic wave comprises a reflected wave from an obstacle.

20. The distance measuring system according to claim 5, wherein, when the received signal strength of the ultrasonic wave is higher than the required received signal strength, the receiver determines that the ultrasonic wave comprises a direct wave.

* * * * *